(12) United States Patent
McCubbin

(10) Patent No.: US 9,495,000 B1
(45) Date of Patent: Nov. 15, 2016

(54) POWER MANAGEMENT OF A WIRELESS DEVICE

(71) Applicant: QUALCOMM Technologies International, Ltd., Cambridge (GB)

(72) Inventor: Robert Ian Ewart McCubbin, Cambridge (GB)

(73) Assignee: QUALCOMM TECHNOLOGIES INTERNATIONAL, LTD., Cambridge (GB)

(*) Notice: Subject to any disclaimer, the term of this patent is extended or adjusted under 35 U.S.C. 154(b) by 74 days.

(21) Appl. No.: 14/701,367

(22) Filed: Apr. 30, 2015

(51) Int. Cl.
*G06F 1/32* (2006.01)

(52) U.S. Cl.
CPC ........... *G06F 1/3275* (2013.01); *G06F 1/3296* (2013.01)

(58) Field of Classification Search
CPC .............................. G06F 1/3275; G06F 1/3296
See application file for complete search history.

(56) References Cited

U.S. PATENT DOCUMENTS

| | | | | |
|---|---|---|---|---|
| 7,523,373 B2* | 4/2009 | Russell | ................... | G11C 5/147 324/750.3 |
| 8,519,775 B2* | 8/2013 | Idgunji | .............. | H03K 19/0013 327/534 |
| 2008/0307240 A1 | 12/2008 | Dahan et al. | | |
| 2009/0204831 A1 | 8/2009 | Cousson et al. | | |
| 2014/0157065 A1 | 6/2014 | Ong | | |
| 2015/0106671 A1 | 4/2015 | Guo et al. | | |
| 2016/0132391 A1* | 5/2016 | Thoen | ................... | G06F 1/3296 714/764 |

OTHER PUBLICATIONS

Wang, J. et al., "Techniques to Extend Canary-Based Standby VDD Scaling for SRAMs to 45 nm and Beyond." IEEE Journal of Solid-State Circuits, vol. 43, No. 11, pp. 2514-2523.
Wang, J., et al., "Standby Supply Voltage Minimization for Reliable Nanoscale SRAMs." Solid State Circuits Technologies, INTECH Open Access Publisher, Jan. 2010, pp. 123-144.
International Search Report and Written Opinion—PCT/EP2016/057369—ISA/EPO—Jun. 22, 2016.

* cited by examiner

*Primary Examiner* — Stefan Stoynov
(74) *Attorney, Agent, or Firm* — Procopio, Cory, Hargreaves & Savitch LLP

(57) ABSTRACT

A method for power management of a wireless device is described. The method comprises supplying a first voltage level to a volatile storage device during a period when the processor is in an operating state; supplying a second voltage level, lower that the first voltage level, to the storage device for retaining data during a period when the processor is in a reduced power state, and determining a value of the second voltage level. The second voltage level is determined by performing a self-test of the storage device to find a minimum second voltage level that gives a number of data errors below a predetermined threshold.

15 Claims, 8 Drawing Sheets

POWER MANAGEMENT OF A WIRELESS DEVICE

BACKGROUND

Wireless devices often have a limited energy supply, such as a battery with a finite capacity. It is desirable that the wireless device uses the energy supply as efficiently as possible in order to prolong the useful operating period of the wireless device, before the energy supply requires recharging or replacing.

One way of prolonging the operating period of a wireless device is to power down some parts of the device during periods when the device is not required to perform any useful activity. For example, some wireless protocols periodically transmit a polling signal to maintain contact between devices in a network. In between the transmission of the polling signal, the transmitter and/or receiver can be powered down. The device has a reduced power consumption during the periods when it is powered down. Therefore, the wireless device has a reduced average power consumption and can be used for a longer period between recharges.

The embodiments described below are not limited to implementations which solve any or all of the disadvantages of known arrangements for power management of wireless devices.

SUMMARY

This Summary is provided to introduce a selection of concepts in a simplified form that are further described below. This Summary is not intended to identify key features or essential features of the claimed subject matter, nor is it intended to be used as an aid in determining the scope of the claimed subject matter.

In accordance with one aspect, the present invention provides a method for power management of a wireless device comprising a processor and a volatile storage device which is connected to and used by the processor. The method comprises: supplying a first voltage level to the volatile storage device during a period when the processor is in an operating state; supplying a second voltage level to the volatile storage device for retaining data during a period when the processor is in a reduced power state, wherein the second voltage level is lower than the first voltage level; and determining a value of the second voltage. The step of determining a value of the second voltage comprises: (i) supplying an initial value of the second voltage level to the volatile storage device; (ii) performing a self-test of the volatile storage device while the second voltage level is supplied to the volatile storage device to provide a result indicating a number of data errors in the volatile storage device; (iii) comparing the result of the self-test with a threshold number of data errors; and (iv) varying the second voltage level to a new value and repeating steps (i)-(iii) with the new value of the second voltage level to find a minimum value of the second voltage level at which the result of the test gives a number of data errors less than the threshold number of data errors.

In accordance with another aspect, the present invention provides a wireless device comprising: a processor; a volatile storage device which is connected to and for use by the processor; and a power management unit. The power management unit is arranged to: supply a first voltage level to the volatile storage device during a period when the processor is in an operating state; supply a second voltage level to the volatile storage device for retaining data during a period when the processor is in a reduced power state, wherein the second voltage is lower than the first voltage level; and determine a value of the second voltage level. The value of the second voltage level is determined by: (i) supplying an initial value of the second voltage level to the volatile storage device; (ii) performing a self-test of the volatile storage device while the second voltage level is supplied to the volatile storage device to provide a result indicating a number of data errors in the volatile storage device; (iii) comparing the result of the test with a threshold number of data errors; and (iv) varying the second voltage level to a new value and repeating steps (i)-(iii) with the new value of the second voltage level to find a minimum value of the second voltage level at which the result of the test gives a number of data errors less than the threshold number of data errors.

In accordance with yet another aspect, the present invention provides a method for determining an optimum voltage value to supply to a volatile storage device. The voltage value may be: a value for a read voltage and/or a write voltage during an operating state of an associated processor or device, or a value of a retention voltage for retaining data during a reduced power state of the processor or device. The method comprises: supplying an initial value of a voltage level to the volatile storage device; (ii) performing a self-test of the volatile storage device while the voltage level at the initial value is supplied to the volatile storage device to provide a result indicating a number of data errors in the volatile storage device; (iii) comparing the result of the self-test with a threshold number of data errors; (iv) varying the voltage level to a new value and repeating steps (i)-(iii) with the new value of the voltage level to find a minimum value of the voltage level at which the result of the test gives a number of data errors less than the threshold number of data errors. The method may determine an optimum value of the voltage level of a memory read or write operation or a memory retention voltage for retaining data in a reduced power state.

Features described below may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

DESCRIPTION OF THE EMBODIMENTS

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, wireless devices may be required to periodically communicate with another device (e.g. to maintain a link or confirm that they are still operating). Otherwise, if the wireless device is not actively performing a task, the device may enter a reduced power (or sleep) state at which it consumes lower power than when fully operational (which may be referred to as an active state). In various scenarios, the time when the device is awake and in the active state may be very short compared to the time when the device is in the sleep state, such that the power consumption in the sleep state is the predominant power consumer. Methods and apparatus are described below in which the power consumption during the sleep state, and in particular the power consumption by some or all of the volatile memory (e.g. the RAM) within the wireless device is reduced. Power is provided to the volatile memory during the sleep state so that data stored in the volatile memory is retained. If the voltage provided is too low, there is a chance that stored data will be lost.

Figure 1:
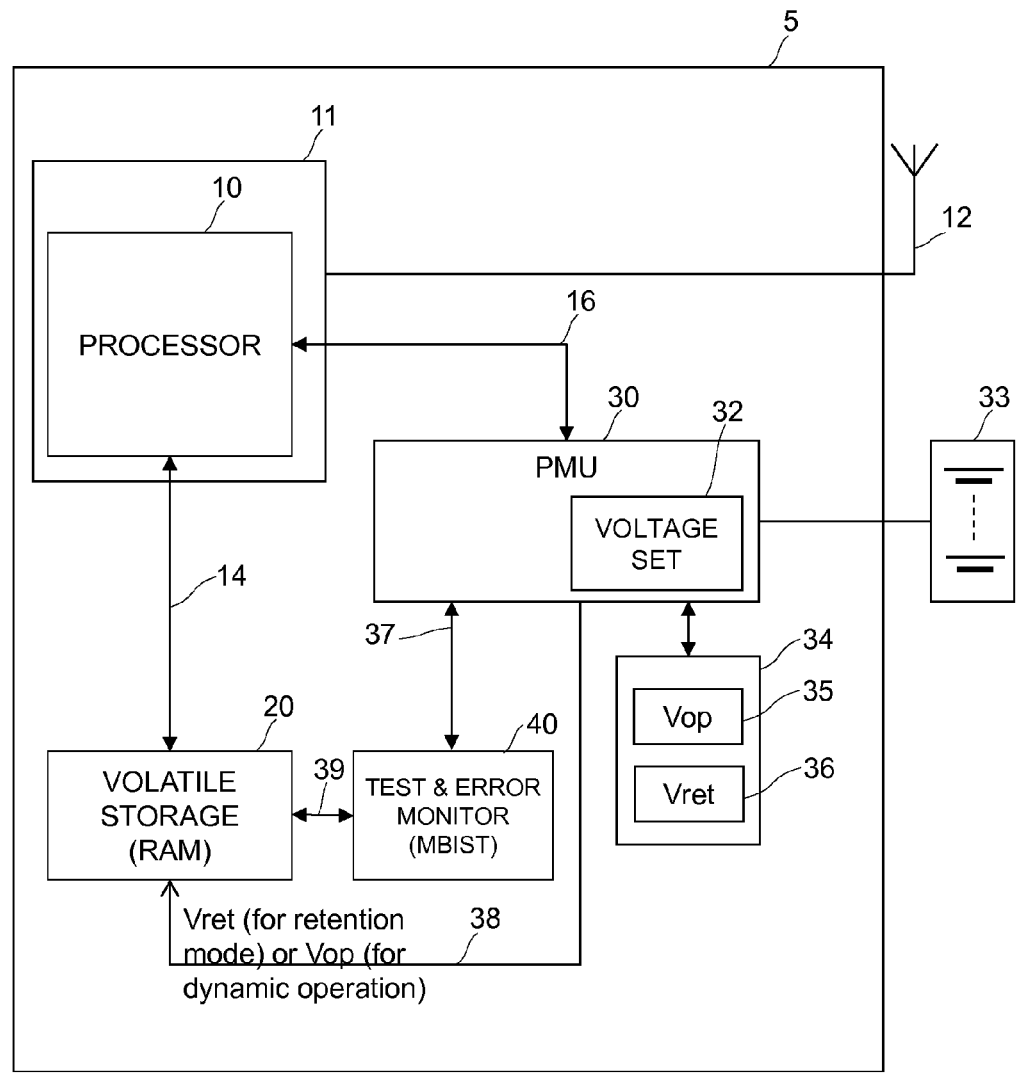
FIG. 1 shows an example of a wireless device with a processor, a volatile storage device and a power management unit.

FIG. 1 schematically shows an example of a wireless device 5. For ease of illustration, FIG. 1 depicts the wireless device 5 in block diagram form showing separate functional blocks. In practice, the illustrated functional blocks may be implemented separately or together in any combination thereof. The functional blocks may be implemented in software, firmware and/or hardware dependent upon design requirements. The wireless device 5 may, for example, be one or a combination of a wireless sensor, a wireless audio device, a general purpose of low-power controller, a remote control device and a watch. The wireless device 5 comprises a processor 10, a volatile storage device or memory 20, a power management unit (PMU) 30 and self-test/error monitoring unit 40. The processor 10 may be a CPU (central processing unit), microcontroller, microprocessor or any other suitable type of processor for processing computer executable instructions to control the operation of the device 5. The processor 10 may form part of a transmitter, receiver, or transceiver 11 which is used for wireless communication via an antenna 12. Alternatively, the processor 10 may perform processing within the wireless device 5, or may control operation of other devices within the overall wireless device 5. The volatile memory 20 may comprise, for example, a single memory instance comprising a plurality of individual memory banks, as described below in relation to FIG. 5, or a plurality of individual memory instances.

The wireless device 5 may comprise a system on a chip (SoC) having embedded memory with a Memory Built-In Self Test (MBIST) unit for testing the memory during an initialisation period (e.g. upon power on), in the conventional manner. In preferred embodiments, such an existing Memory Built-In Self Test (MBIST) unit can be used as the self-test/error monitoring unit 40 of the wireless device 5 to operate a method in accordance with the present invention as detailed below. In such embodiments, an MBIST unit may be shared between multiple memory instances (i.e. one or a sub-set of banks of a device or separate devices), or an MBIST unit may be provided that is dedicated to each individual memory instance. Thus, the MBIST unit may be integrated on the same die as the corresponding volatile storage device 20 and/or other memory instance(s).

The processor 10 is connected 14 to the volatile storage device 20 and uses the device 20 to store data. The type of data stored in the volatile storage device 20 can be program data (e.g. operating system software, applications) or user data. The volatile storage device 20 is volatile in the sense that it requires the application of a power supply in order to retain data values. When a power supply is turned off, or reduced below a certain value, data will be corrupted. The volatile storage device 20 can be a random access memory (RAM), a register file, an array of flip-flops or the like.

The power management unit 30 is connected to an energy supply 33, such as a battery, which is typically external to the wireless device 5. The power management unit 30 provides a power supply 38 to the volatile storage device 20, such as a supply voltage. The power management unit 30 may have associated voltage or current regulation circuits or any suitable control circuitry, which may be separate from or included within the power management unit 30, for controlling the supply of power at required values. The power management unit 30 comprises logic 32 for setting a voltage level of the supply voltage 38 to the volatile storage 20 and this logic 32 may be programmable logic such that the voltage level of the supply voltage 38 to the volatile storage 20 is programmable. A storage 34 is arranged to store data values 35, 36 used by the power management unit 30 for setting the supply voltage. The data values can comprise: (i) a data value Vop 35 for a supply voltage during a period when the processor is in an operating state, and (ii) a data value Vret 36 for a supply voltage during a period when the processor is in a reduced power state, where Vret<Vop. It will be appreciated that, in practice, Vop may comprise read and write voltages, which may have the same value or two different values. In various examples, Vop may be a fixed value for the operational life of the wireless device 5, whereas, as described in more detail below, the value of Vret may change (and in various examples may increase) over the operational life of the wireless device 5, based on a dynamic determination thereof. In other examples, the value of Vop may also change over the operational life of the wireless device 5, e.g. in accordance with manufacturer recommended values for Vop dependent upon device age or based on a dynamic determination thereof. The storage 34 is non-volatile storage.

The self-test/error monitoring unit 40 is arranged to perform a test of the volatile storage device 20 to determine if the volatile storage device is functioning correctly, or if any part of the volatile storage device 20 is functioning incorrectly. As mentioned above, conventional memory testing may be performed upon device power on. For example, the self-test/error monitoring unit 40 (e.g. MBIST) may determine that certain data cells of the volatile storage device 20 are not correctly retaining data, in order that redundant or alternative data cells are subsequently used in their place during device operation. Various existing test algorithms can be used, such as a checkerboard algorithm, which uses a physical checkerboard of zero-one data values in the memory, one or more of the various March algorithms, a Galloping Pattern (GALPAT), a Walking Pattern, a Butterfly algorithm. As well known in the art, the optimal algorithm(s) selected to perform the memory testing (e.g.

MBIST) for a given application or IC chip will depend on the logical to physical mapping, the architecture (e.g. memory layout) and connectivity of each memory instance. Conventional testing involves, for example, writing test pattern data bits into a memory and thereafter reading the data bits to determine whether any of the memory cells are not correctly storing and retaining data bits. The test algorithm defines fixed voltage values for the reading and writing operations during testing.

In embodiments of the present invention, the self-test/error monitoring unit 40 performs additional memory testing, as described herein and referred to, for brevity, as "self-test", dynamically during the lifetime of the IC chip to identify data cells that are failing when the voltage is reduced during the low power or sleep state, in order that the voltage value can be increased to ensure the data cells retain data. Thus, the selection of the most appropriate test algorithm will be based on the memory bits most likely to fail when the voltage is reduced and the profile of the failing bits. The algorithm selected may vary for different instances of the same memory type, since the location of the failing bits in the memory may be different due to the different loadings on the signal or the power supply connectivity differences. The self-test/error monitoring unit 40 is connected 37 to the power management unit 30 and (internally) connected 39 to the volatile storage device or memory 20. The voltage setting logic 32 of the power management unit 30 sets a voltage value Vret depending on the results received from the self-test/error monitoring unit 40.

In use, the processor 10 is powered down during periods when it is not required. For example, the processor 10 can operate during a period when the transmitter 11 is required to transmit a polling signal and can then be powered down between those periods. The ratio of operating period to reduced power period can be, for example, 1:999 (1 μs on, 999 μs powered down) or a higher or lower ratio. During periods when the processor is powered down, data is retained in the volatile storage device 20 by supplying a voltage to the volatile storage device 20 which is sufficient to retain data in the storage device. In this way, upon powering up the processor 10 can operate without any delay or with only minimal delay.

One application of the wireless device 5 of FIG. 1 is in an Internet of Things (IoT) scenario. The wireless device 5 can comprise, or form a part of, a wireless sensor which communicates wirelessly with a host connected to the Internet. The host can be a smartphone or other device. A suitable short range wireless technology for making this connection is Bluetooth® Smart (or Bluetooth® Low Energy, BLE). There is a need to reduce the power consumption of Bluetooth® Smart chips in order to extend battery life for this type of application.

Manufacturers of volatile storage devices, including IC chips having embedded volatile memory, publish data sheets with recommended values of operating voltages. The manufacturer will specify a recommended voltage value for data retention in the volatile storage device 20. The recommended value is typically based on factors such as: manufacturing process (used to make the volatile storage device), operating temperature and age of the volatile storage device. The recommended value is typically a conservative value (e.g. as the actual voltage required to retain data is likely to increase with age and temperature) and it may be possible to supply a voltage at a lower value and still retain data in the volatile storage device 20. Embodiments of the present invention enable the retention voltage supplied to the volatile storage device 20 to be lower than a manufacturer recommended value.

Figure 2:
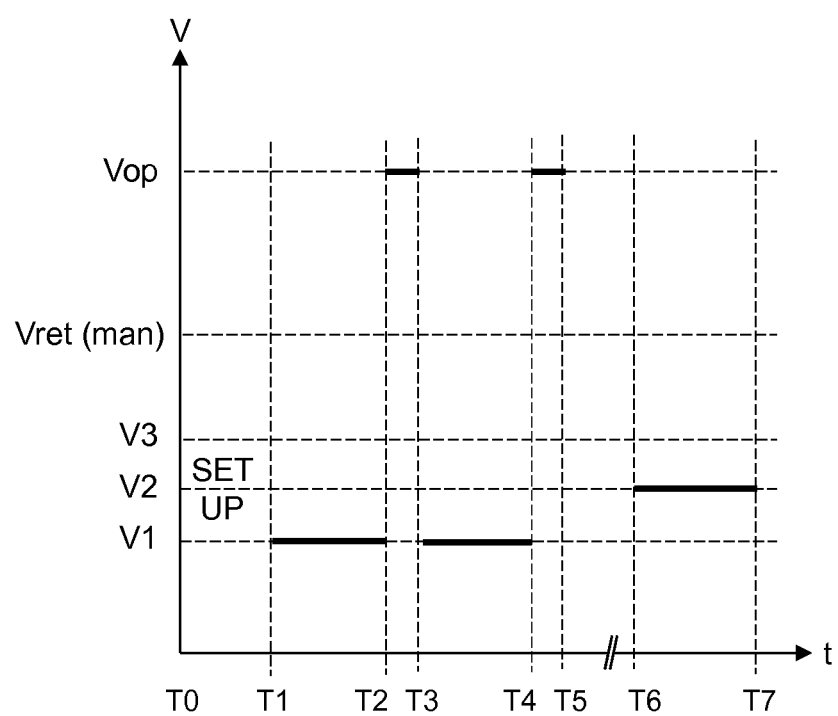
FIG. 2 shows an example of voltage levels supplied to a volatile storage device over a period of time.

FIG. 2 shows an example of voltage levels supplied to a volatile storage device over a period of time. The time period T0-T1 represents an initialisation or set-up period of the device during which the retention and operating voltage values are calibrated. This initialisation period can occur during production test (before or after the device is packaged), during commissioning of the device (e.g. at a factory, when it is incorporated into a module or end product) or during a start-up period of the device whilst in service. Since the initial calibration process to determine the retention and operating values will consume power in itself, typically an assessment of the timing of the initialisation period should be done in order to optimise the total lifetime power usage.

As discussed below, during the initialisation period, a self-test of the volatile storage device 20 is performed. Thus, the self-test would typically be done when the data stored is not wanted and a full checking process could be performed. Alternatively, or in addition, if the data stored in the memory is required (e.g. when the device is in service), then its integrity could be verified by using a standard checking process such as error detection and error correction processes (e.g. CRC checking) that may use additional redundant bits for the memory.

During the initialisation period, a method determines an optimum value of retention voltage, Vret, for supplying to the volatile storage device during reduced power periods. The method can perform a self-test of the volatile storage device 20, using, for example, a conventional MBIST test algorithm, as discussed above, together with a retention voltage Vref that is varied. The optimum value for Vref can be a minimum value of voltage at which an acceptable number of data errors occurs. Stated another way, this can be a minimum value of the voltage level Vret at which the result of the test gives a number of data errors less than a threshold number of data errors. Voltages supplied to the volatile storage device 20 during the initialisation period are not shown in FIG. 2, but some examples are shown in FIGS. 3 and 4.

After the initialisation period, at time T1 the processor 10 is in a reduced power or sleep state. In this example, a value V1 of retention voltage Vret has been determined for use during reduced power periods. The power management unit 30 supplies voltage V1 to the volatile storage device. At time T2 the processor 10 changes to an operating state and the power management unit 30 supplies an increased voltage Vop to the volatile storage device. At time T3 the processor 10 enters a reduced power state and the power management unit 30 supplies a reduced voltage V1 to the volatile storage device. At time T4 the processor 10 returns to an operating state and the power management unit 30 supplies a voltage Vop to the volatile storage device.

All, or part of, the method performed during initialisation (T0-T1) can be repeated at some point during operation of the device to determine if the voltage is correct, or if it should be changed. A further self-test of the volatile storage device 20 can be performed using one or more test values. For example, a further self-test can be performed during the period T3-T4. In the example of FIG. 2, the method has determined that the voltage should be increased. The method may have determined that an unacceptable number of errors occurred while operating at V1. In general, the method may determine an increased value of the voltage for use during the reduced power periods, or a reduced value of the voltage for use during the reduced power periods. Referring again to FIG. 2, at some later time T6 the processor 10 enters a reduced power state. The power management unit 30 supplies a voltage V2 to the volatile storage device. Voltage V2 is higher than the value V1 previously used during the reduced power periods T1-T2 and T3-T4, as the further self-test determined that the voltage should be increased.

Figure 3:
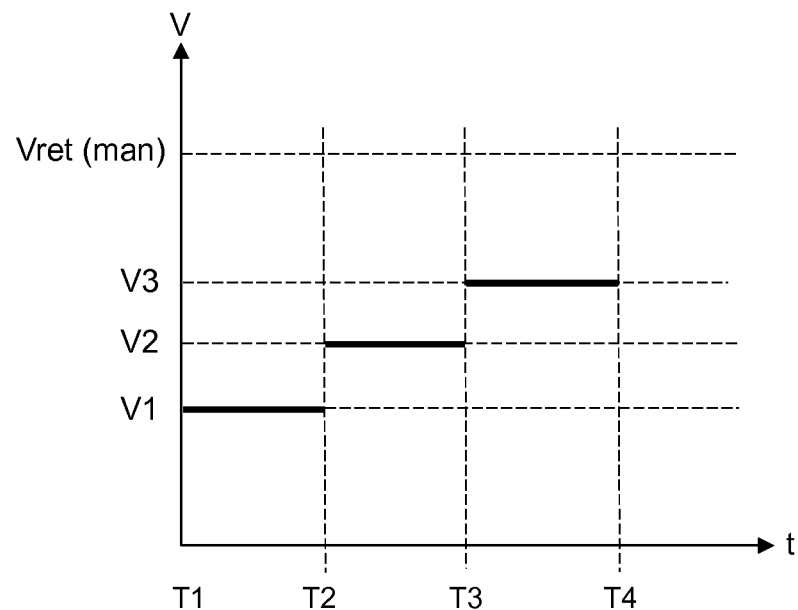
FIG. 3 shows an example of voltage levels supplied to a volatile storage device to determine a value of a retention voltage.
Figure 4:
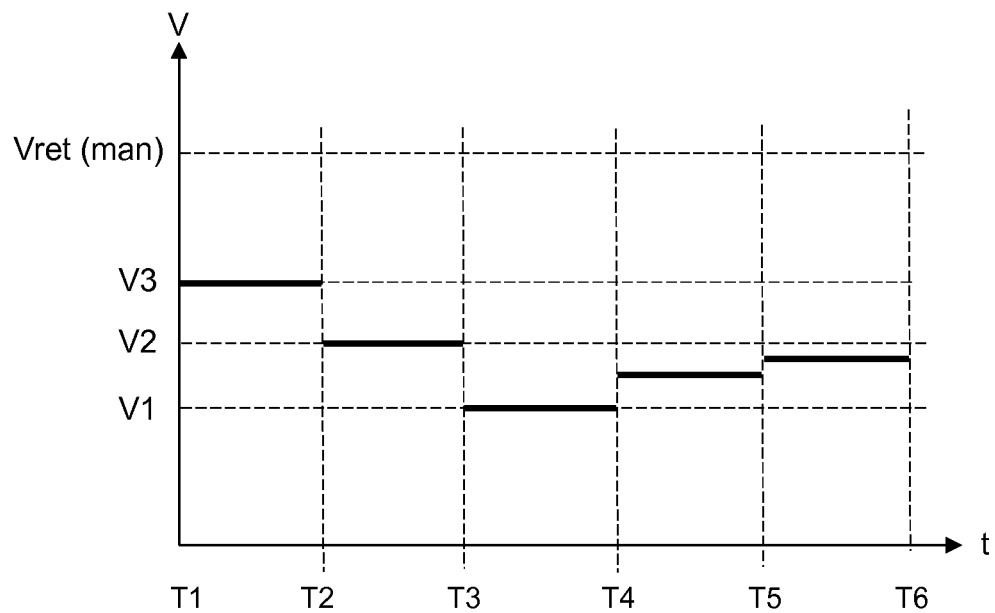
FIG. 4 shows an example of voltage levels supplied to a volatile storage device to determine a value of retention voltage.

FIGS. 3 and 4 show two examples of voltage levels supplied to a volatile storage device during an initialisation period (e.g. T0-T1 of FIG. 2) or during one of the subsequent periods when a self-test is performed. FIG. 3 shows an example where a plurality of different voltages are sequentially supplied to the volatile storage device 20. At time T1 a starting value of voltage, V1, is supplied to the volatile storage device. A self-test is performed on the volatile storage device while voltage V1 is supplied to the volatile storage device 20. The test provides a result indicating a number of data errors in the volatile storage device. This result can be compared with a threshold number of data errors, representing an acceptable number of errors for operation. During time T2-T3 an increased value of voltage V2 (V2>V1) is supplied to the volatile storage device. A further self-test is performed on the volatile storage device while voltage V2 is supplied to the volatile storage device 20. This is repeated again during the period T3-T4 at a higher voltage V3 (V3>V2). The method can stop if a result of the self-test at a voltage gives a number of data errors lower than the threshold number of data errors. In this way, the method finds a minimum value of the retention voltage, Vret, for operation of the volatile storage device.

FIG. 4 shows another example where a plurality of different voltages are sequentially supplied to the volatile storage device 20. This example differs from FIG. 3 in that it applies a sequence of progressively reduced voltages to the volatile storage device 20. At time T1 a starting value of voltage, V3, is supplied to the volatile storage device. A self-test is performed on the volatile storage device while voltage V3 is supplied to the volatile storage device 20. The test provides a result indicating a number of data errors in the volatile storage device. This result can be compared with a threshold number of data errors, representing an acceptable number of errors for operation. During time T2-T3 a reduced value of voltage V2 (V2<V3) is supplied to the volatile storage device. A further self-test is performed on the volatile storage device while voltage V2 is supplied to the volatile storage device 20. This is repeated again during the period T3-T4 for a lower voltage V1 (V1<V3). The method can stop if a result of the self-test at a voltage gives a number of data errors higher than the threshold number of data errors. In this example, consider that voltage V1 gives a number of data errors higher than the threshold number of data errors. Voltage V2 is selected as the minimum value of the retention voltage, Vret, for operation of the volatile storage device during reduced power periods.

In the examples of FIGS. 3 and 4 the increments in voltage (V1→V2, V2→V3) are linear. However, the increments can be non-linear. In another variation, it is possible to perform one or more further iterations of self-test of the volatile storage device upon determining a voltage level that gives a number of data errors higher than the threshold number of data errors. Consider the example of FIG. 4. The result of the self-test at voltage V1 gives a number of data errors higher than the threshold number of data errors. One option is to stop the testing at this point and select voltage V2 as the minimum value of the retention voltage for operation of the volatile storage device during reduced power periods. Another option is to perform a further self-test at a voltage between V1 and V2 during the period T4-T5. This can be repeated at a different voltage during the period T5-T6. For example, if the test during T4-T5 indicated a number of data errors higher than the threshold number of data errors, the voltage can be increased to a value between that used during period T4-T5 and V2, which was known to be acceptable. In this way, a value of retention voltage is found to a higher level of resolution, which will further help to save power.

When the method of determining a value of the retention voltage is repeated at a later time, the method can begin by supplying a value of retention voltage which was determined during the first initialisation period, or during the previous initialisation period.

When a value of Vret is found using any of the methods described above, the power management unit 30 stores the new value of Vret (e.g. in non-volatile storage 34). The new value can overwrite any existing value, or the power management unit 30 may store previously used values of Vret for subsequent use and/or analysis.

Figure 5:
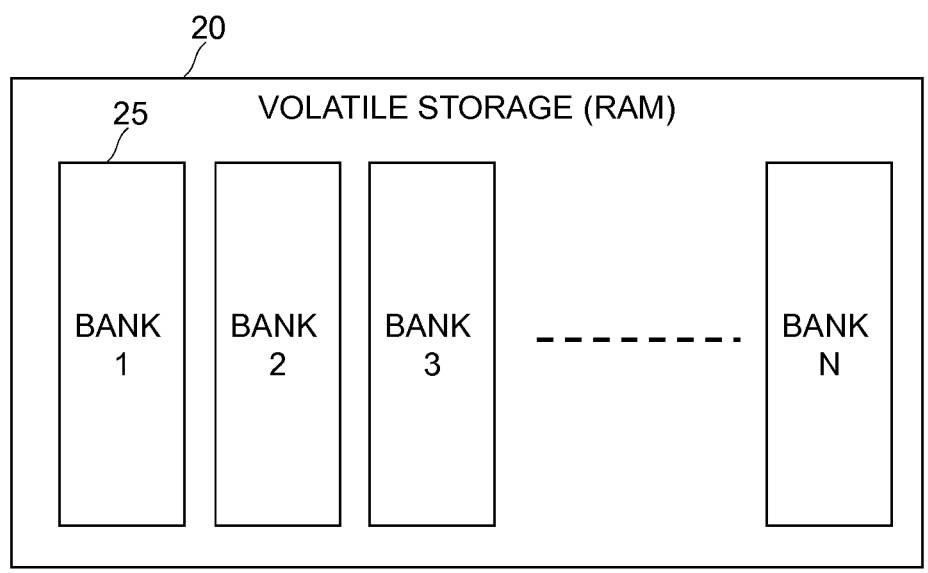
FIG. 5 shows a volatile storage device with a plurality of storage banks.
Figure 5:
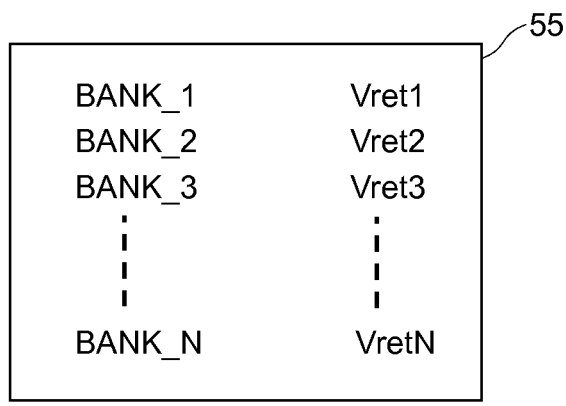

FIG. 5 shows an example of a volatile storage device or memory 20 comprising a plurality of storage banks 25. N banks are shown, where N≥2. Any of the methods described above, for finding a minimum value of voltage for use during reduced-power periods, can be applied to a memory with a plurality of storage banks A self-test can be performed on each of the banks 25 of the volatile storage device 20 individually, or on a sub-set of the banks 25 of the volatile storage device 20. A minimum value of retention voltage, Vret, is obtained for each tested bank 25 or group of banks 25 of the storage device 20, where Vret is a value of voltage which has to be supplied to the overall device 20 in order to meet a particular error rate at a bank 25. The storage device 34 can store a table 55 of Vret values of the form shown in FIG. 5. An overall value of Vret can be selected based on the individual requirements of the banks 25. One strategy is to select a value of Vret which is equal to the highest value in the table 55 for the banks 25 required.

Figure 6:
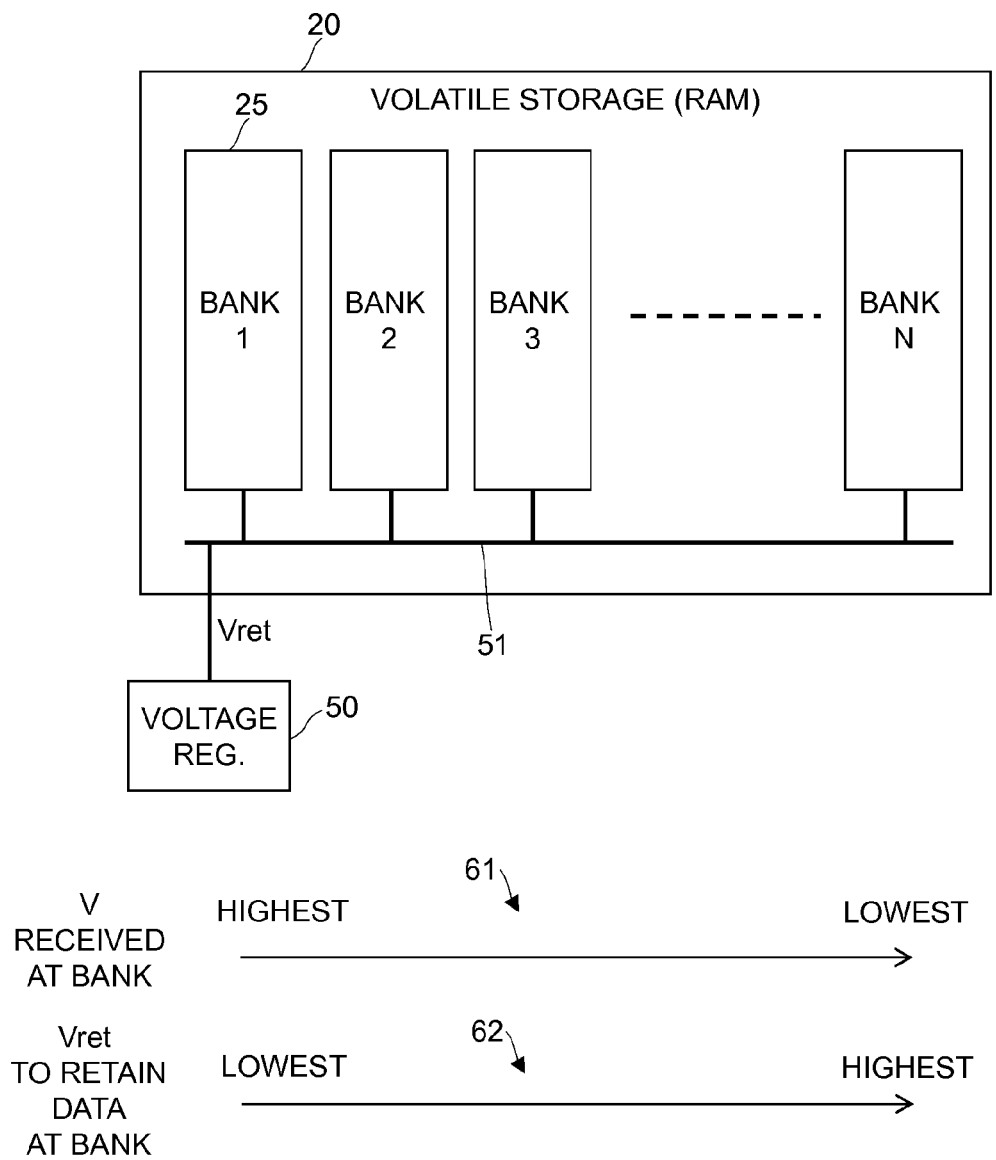
FIG. 6 shows a volatile storage device with a plurality of storage banks and varying voltage across the device.

FIG. 6 shows another example of a volatile storage device or memory 20 comprising a plurality of storage banks 25. In this example, a voltage regulator 50 supplies a voltage to the banks 25 via a voltage rail 51. The voltage regulator 50 can be provided on the same chip as the volatile storage device 20, or on a separate chip. The voltage regulator 50 is typically a subcomponent of the power management unit (PMU) 30, but it may be separate in certain architectures. In either case, the PMU 30 instructs the voltage regulator 50 to supply a particular voltage level to the banks 25.

In this arrangement, the actual supply voltage at each bank 25 will vary according to distance from the regulator and the precise power supply routing such as the routing track thicknesses, its resistance and capacitive loading. This variation in voltage may be caused by increasing resistance (and voltage drop) along the supply rail between the voltage regulator and the bank. In FIG. 6, bank_1 is closest to the voltage regulator 50, and bank N is furthest from the voltage regulator 50. FIG. 6 shows a voltage distribution 61 across the storage device 20. For any given value of voltage Vret output by the regulator 50, bank_1 will receive the highest supply voltage (i.e. a voltage closest in value to Vret) while bank N will receive the lowest supply voltage (i.e. a voltage less than Vret). FIG. 6 also shows an example distribution 62 of values of Vret to retain data. Banks located furthest from the regulator 50 require a higher voltage Vret supplied to the device 20 in order to retain data, as voltage is dropped across the supply path to the banks. This means that some banks nearest the voltage regulator 50 will be operating at a higher voltage than actually necessary to retain data, and will be wasting power.

The distribution 62 of values of Vret shown in FIG. 6 ignores any variations in the values of Vret which may be due to process variations or other factors which may mean that even without the variation in actual supply voltage, the value of Vret for each bank may vary (e.g. as described above with reference to FIG. 5). As a result of the combination of the process variations or other factors and the distance from the regulator 50, there may not be a decrease in Vret when moving away from the regulator and considering each bank in turn and a bank which is further away from the regulator than another bank may have a lower value of Vret.

Figure 7:
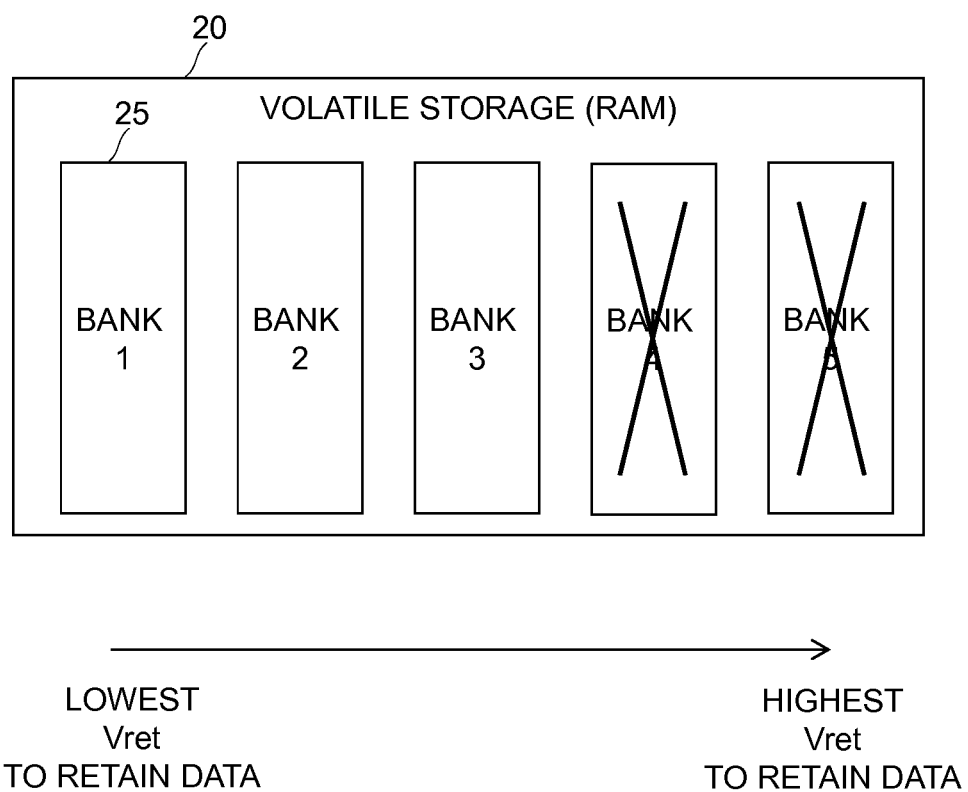
FIG. 7 shows selective operation of storage banks.

FIG. 7 shows the volatile storage device or memory 20 comprising a set of five storage banks 25. Banks 25 can be turned on/off as required, to save power. These banks may be denoted banks 1-5 based on the value of Vret as determined using the testing during an initialisation phase, as described above, such that bank 1 has the lowest value of Vret (as determined based on a threshold number of errors), bank 2 has the next lowest value, etc., with bank 5 having the highest value of Vret (as determined based on the threshold number of errors).

If there is only a need to store a quantity of data which can be accommodated in three banks, then banks 4 and 5 are turned off and a value of Vret for bank 3 (which will be the highest value for all of banks 1-3) may be used when in the low power state. Banks 4 and 5 are turned off as they require a higher voltage to the device 20 to retain data, Vret, than banks 1-3. Banks 1-3 are therefore the most power efficient way of storing the quantity of data. The selection of banks can be based on quantity of data to be stored. In this example, the selection of banks is based on the self-test results indicating a value of voltage, Vret, required to be supplied to the device 20 in order to retain data in a bank. In other examples, however, selection of banks may be performed based on simulations and modelling of the power supply connections from the regulator, without requiring the value of Vret for each bank to be determined using the self-test regime described above.

In some scenarios, it may be beneficial to reserve parts of the memory (e.g. certain cells, or blocks of cells) for use solely for test purposes, for instance to allow testing to be performed while the storage device is in use. For example, the reserved area could be a 'canary' type area of the device associated with the bits of the memory that are found to be the first to start failing at reduced voltage during a complete test of the memory element. This mechanism could operate as follows. A complete test of the memory is performed and the most vulnerable bits determined to be those that fail first as the voltage is reduced. The location of the corresponding part of the memory can be then stored in a either a non-volatile memory, or a memory that retains its power. This area of memory could then be reserved for test purposes alone to determine when the memory retention starts to fail. The other parts of the memory could then retain the user's data in-tact without being affected by the 'early failing' are, which would be used just for memory verification purposes. The size of the memory test area allocated for this purpose could be determined by how rapidly the number of failing memory bits increases as the voltage is reduced and a decision made, accordingly.

Figure 8:
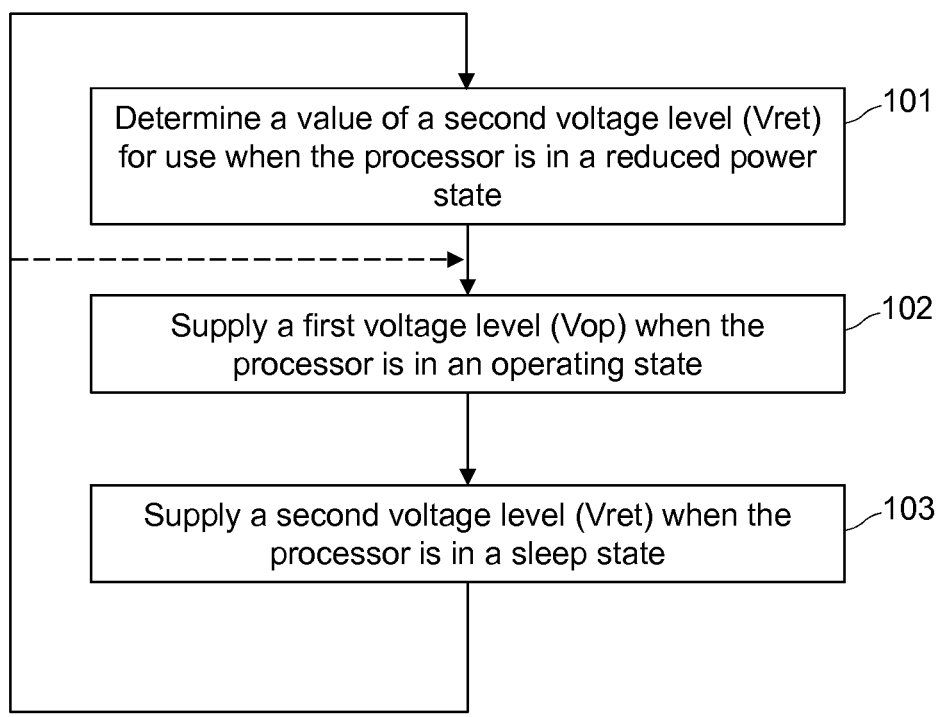
FIG. 8 shows a method of power management of a wireless device.

FIG. 8 shows a method of power management of a wireless device comprising a processor and a volatile storage device, which is connected to and used by the processor. The method may be performed, for example, by the power management unit 30 including the voltage setting logic 32 of the wireless device 5 shown in FIG. 1. As discussed above, the functionality of the power management unit 30 may be implemented in hardware, software and/or firmware. At block 102 the method supplies a first voltage level (Vop) to the volatile storage device during a period when the processor is in an operating state. The first voltage level (Vop) may be a data value 35 obtained from storage 34 or another predetermined or calculated value. At block 103 the method supplies a second voltage level (Vret) to the volatile storage device during a period when the processor is in a reduced power state. The second voltage (Vret) is lower than the first voltage level (Vop). The second voltage level (Vret) may be a data value 36 obtained from storage 34 or another predetermined or calculated value. The method also comprises a block 101 of determining the value of the second voltage level. Block 101 can be performed, for example, during an initialisation period and the result can be stored as the data value 36 in storage 34. Block 101 may be performed once (e.g. when the wireless device is initially switched on), or may be performed multiple times during the lifetime of the wireless device (e.g. when the wireless device is initially switched on and again periodically when the wireless device is reset/rebooted subsequent to the initial start-up).

Figure 9:
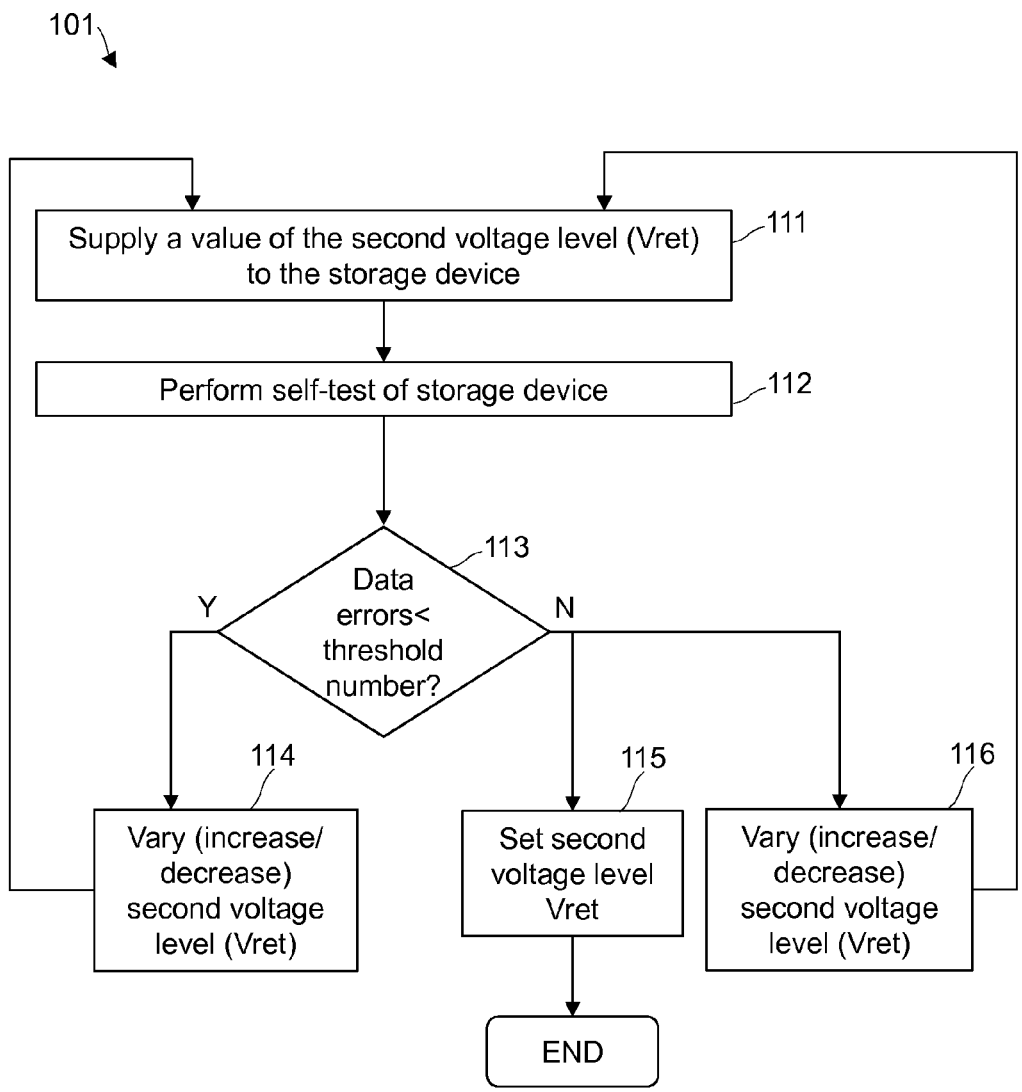
FIG. 9 shows a method of determining a value of a retention voltage.

FIG. 9 shows an example of operations which can be performed at block 101 of FIG. 8. Block 111 supplies an initial value of the second voltage level to the volatile storage device. Block 112 performs a self-test of the volatile storage device while the second voltage level is supplied to the volatile storage device to provide a result indicating a number of data errors in the volatile storage device. Block 113 compares a result of the test with a threshold number of data errors. This threshold number can represent an acceptable number of errors for operation.

The threshold number is typically zero, but may be larger than zero in some circumstances. In particular, the probability of a bit error will depend on the amount of memory in a system and the manufacturing quality. As such, manufacturer guidelines are typically given to introduce redundancy with error detection and error correction techniques to accommodate for bit failures. These bit failures would typically be detected and would be masked out from being used, by means of standard techniques. However, the bits that are deemed to be good and functional within the normal operating range of the memory would be monitored during the present method. The number of bit errors acceptable would typically be zero, after the standard verification and configuration has been performed, but, in some circumstances relatively small numbers of previously unidentified bit errors may be acceptable.

Returning to block 113 of FIG. 9, if the number of errors is less than the threshold number (typically zero), the method proceeds to block 114 and varies (e.g. increases or decreases) the second voltage level to a new value. FIG. 9 implements a method in which the second voltage level may be varied using a sequence as described above in relation to FIG. 4. It will be appreciated that other suitable schemes for varying the second voltage level may be used, such as the sequence shown in FIG. 3, with appropriate modifications to the method. From block 114, the method proceeds to block 111 using the new value of Vret set at block 114. Returning to block 113, if the number of errors is greater than the threshold number, the method can proceed to block 115 and set a value of the second voltage level based on the results of the previous blocks. For example, the second voltage level, Vret, can be set to the lowest value which gave a number of data errors less than the threshold number of data errors. Again, if the number of errors is greater than the threshold number at block 113, the method can proceed to block 116 and vary (e.g. increase or decrease) the second voltage level to a new value. This can find a minimum value of Vret to a higher resolution than the normal increments/decrements used at block 114. The method proceeds to block 111 using the new value of Vret set at block 116.

Embodiments of the invention advantageously implement the above-described method using existing on-chip MBIST functionality (which typically takes the form of test circuits and other hardware and firmware) for the method, without the need for significant additional modifications. In addition, since the self-test is performed dynamically, the value of Vref can be recalibrated to take account of changes in the environment, device age and other factors impacting the reliability of the data cells in the volatile storage device throughout its lifetime.

Whilst the method has been described for determining an optimum value for the retention voltage, Vref, of a volatile memory (i.e. for retaining data during a reduced power or sleep mode of the associated wireless device or processor), the method may also be applied for determining optimum operating voltage values, Vop, of a volatile memory (i.e. for reading or writing during an operational mode of the associated wireless device or processor). In each case, the optimum voltage is determined using the above-described self-test process, in which the voltage is dynamically varied, to find a minimum acceptable voltage value, such that the use of the optimum voltage(s) (Vop and/or Vref) conserves power.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements. The term "volatile storage device" is intended to encompass any form of volatile memory, including, for example, embedded memory comprising multiple memory instances, having one of more memory banks or arrays, arranged in a distributed configuration on the chip. The term "memory instances" is intended to include semiconductor memory IP, which typically has its own memory compiler and separate read/write circuitry.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method for power management of a wireless device comprising a processor and a volatile storage device which is connected to and used by the processor, the method comprising:
   supplying a first voltage level to the volatile storage device during a period when the processor is in an operating state;
   supplying a second voltage level to the volatile storage device for retaining data during a period when the processor is in a reduced power state, wherein the second voltage level is lower than the first voltage level; and
   determining a value of the second voltage level by:
      (i) supplying an initial value of the second voltage level to the volatile storage device;
      (ii) performing a self-test of the volatile storage device while the second voltage level is supplied to the volatile storage device to provide a result indicating a number of data errors in the volatile storage device;
      (iii) comparing the result of the self-test with a threshold number of data errors;
      (iv) varying the second voltage level to a new value and repeating steps (i)-(iii) with the new value of the second voltage level to find a minimum value of the second voltage level at which the result of the test gives a number of data errors less than the threshold number of data errors.

2. A method according to claim 1 wherein the step of determining a value of the second voltage level is performed during an initialisation period of the wireless device.

3. A method according to claim 2 wherein at least steps (i)-(iii) are repeated at a later time, wherein the initial value of the second voltage level at step (i) is the value of the second voltage level determined during one of: the initialisation period and a previous repeat of steps (i)-(iii).

4. A method according to claim 1 wherein step (iv) reduces the second voltage level before a repeat of steps (i)-(iii) and the minimum value of the second voltage level is the last value at which the result of the test gives a number of data errors less than the threshold number of data errors.

5. A method according to claim 1 wherein step (iv) increases the second voltage level before a repeat of steps (i)-(iii) and the minimum value of the second voltage level is the first value at which the result of the test gives a number of data errors less than the threshold number of data errors for operation.

6. A method according to claim 1 wherein the volatile storage device comprises a plurality of storage banks and the step of determining a value of the second voltage level is performed for at least two of the storage banks to find a minimum value for each of the at least two storage banks.

7. A method according to claim 6 further comprising:
   determining a number of the storage banks required;
   selecting the storage banks which have the lowest of the minimum values of second voltage level; and
   using the selected storage banks.

8. A wireless device comprising:
   a processor;
   a volatile storage device which is connected to and for use by the processor;
   a power management unit arranged to:

supply a first voltage level to the volatile storage device during a period when the processor is in an operating state;

supply a second voltage level to the volatile storage device for retaining data during a period when the processor is in a reduced power state, wherein the second voltage is lower than the first voltage level; and determine a value of the second voltage level by:
  (i) supplying an initial value of the second voltage level to the volatile storage device;
  (ii) performing a self-test of the volatile storage device while the second voltage level is supplied to the volatile storage device to provide a result indicating a number of data errors in the volatile storage device;
  (iii) comparing the result of the test with a threshold number of data errors;
  (iv) varying the second voltage level to a new value and repeating steps (i)-(iii) with the new value of the second voltage level to find a minimum value of the second voltage level at which the result of the test gives a number of data errors less than the threshold number of data errors.

9. A wireless device according to claim 8, wherein the power management unit is arranged to determine a value of the second voltage level during an initialisation period thereof.

10. A wireless device according to claim 9 wherein the power management unit is arranged to repeat at least steps (i)-(iii) at a later time, wherein the initial value of the second voltage level at step (i) is the value of the second voltage level determined during one of: the initialisation period and a previous repeat of steps (i)-(iii).

11. A wireless device according to claim 8 wherein the power management unit is arranged so that step (iv) reduces the second voltage level before a repeat of steps (i)-(iii) and the minimum value of the second voltage level is the last value at which the result of the test gives a number of data errors less than the threshold number of data errors.

12. A wireless device according to claim 8 wherein the power management unit is arranged so that step (iv) increases the second voltage level before a repeat of steps (i)-(iii) and the minimum value of the second voltage level is the first value at which the result of the test gives a number of data errors less than the threshold number of data errors for operation.

13. A wireless device according to claim 8 wherein the volatile storage device comprises a plurality of storage banks and the step of determining a value of the second voltage level is performed for at least two of the storage banks to find a minimum value for each of the at least two storage banks.

14. A wireless device according to claim 13, wherein the power management unit is further arranged to:
  determine a number of the storage banks required;
  select the storage banks which have the lowest of the minimum values of second voltage level; and
  use the selected storage banks.

15. A method for determining an optimum voltage value to supply to a volatile storage device, the method comprising:
  (i) supplying an initial value of a voltage level to the volatile storage device;
  (ii) performing a self-test of the volatile storage device while the voltage level at the initial value is supplied to the volatile storage device to provide a result indicating a number of data errors in the volatile storage device;
  (iii) comparing the result of the self-test with a threshold number of data errors;
  (iv) varying the voltage level to a new value and repeating steps (i)-(iii) with the new value of the voltage level to find a minimum value of the voltage level at which the result of the test gives a number of data errors less than the threshold number of data errors.

* * * * *